United States Patent Office 3,345,249
Patented Oct. 3, 1967

3,345,249
POLYHYDROXYNAPHTHALENE CONTAINING
ADHESIVE COMPOSITIONS
John Thomas Stephan, 1318 W. Kessler,
Longview, Wash. 98632
No Drawing. Filed Apr. 10, 1963, Ser. No. 271,877
14 Claims. (Cl. 161—262)

The present invention relates to condensation products by reacting a polyhydroxynaphthalene with an aldehyde, or with an aldehyde containing composition such as a monohydric phenol-aldehyde condensation product or the like.

The invention in one aspect pertains to condensation products formed by reaction of polyhydroxynaphthalene with an aldehyde to produce a polyhydroxynaphthalene-aldehyde resin (also termable a naphthalenediol-aldehyde resin), which is either a thermoplastic type resin or a thermosetting type resin depending upon the amount of aldehyde employed in the reaction.

In another aspect, the invention pertains to the formation of what may be termed a polyhydroxynaphthalene modified phenol-aldehyde resin (also termable a polyhydroxynaphthalene- and phenol-aldehyde resin) by reaction of a polyhydroxynaphthalene (specifically 1,5-dihydroxynaphthalene) with an aldehyde containing composition, specifically a monohydric phenol-aldehyde condensation product containing free aldehyde, to produce a thermosetting type resin having a markedly improved speed of set.

In another form of the invention, a polyhydroxynaphthalene- and monohydric phenol-aldehyde thermosetting resin is formed by a condensation reaction of a polyhydroxynaphthalene with an aldehyde containing condensation product (specifically an alkali catalyzed monohydric phenol-aldehyde condensation product), said condensation reaction occurring upon addition of free aldehyde in one or more steps.

In general, the condensation products according to the present invention have utility, for example, as resin adhesives in the bonding of wood and wood products such as plywood, flake board, particle board, paper, plastic, rock wool, and the like.

By the terms "polyhydroxynaphthalene" and "naphthalenepolyol" I mean any hydroxylated derivative of naphthalene having more than one phenolic-type hydroxyl group per molecule. Hydroxynaphthalenes having only one phenolic-type hydroxyl group per molecule (i.e. 1-naphthol and 2-naphthol) do not fall within the definition category. Polyhydroxynaphthalenes of the type addressed by the present invention include dihydroxynaphthalenes (or naphthalenediols), such as 1,5-dihydroxynaphthalene and 2,7-dihydroxynaphthalene for example, and include trihydroxynaphthalenes (or naphthalenetriols), such as 1,3,5-naphthalenetriol for example, and also include tetrahydroxynaphthalenes (or naphthalenetetraols), such as 1,3,5,7-tetrahydroxynaphthalene for example.

Chemical group substitution onto the two aromatic rings of naphthalene gives rise to a large number of well-known isomeric compounds which are by and large difficult to separate one from the other. The polyhydroxynaphthalene compounds of use in the present invention are those which may be made by the fusion of disodium naphthalene disulfonates, trisodium naphthalene trisulfonates, tetrasodium naphthalene tetrasulfonates, and their mixtures with excess sodium hydroxide to yield the sodium salts of the polyhydroxynaphthalenes, which may then be recovered by springing with acid and extracting with suitable immiscible organic solvent.

When I refer to aldehyde I mean monoaldehydes such as formaldehyde, acetaldehyde, propionaldehyde, furfuraldehyde, benzaldehyde as well as dialdehydes such as glyoxal, methylglyoxal and the like.

When I refer to monohydric phenol-aldehyde condensation products I mean the products of chemical reaction between the previously defined aldehydes and a phenolic compound such as phenol, o-cresol, metacresol, paracresol, the various xylenols, alpha-naphthol, beta-naphthol, mixtures thereof, and the like. Particularly, for example, the reaction products disclosed in U.S. Patents Nos. Re. 23,347; 2,360,376, 2,437,981, 2,462,253, constitute typical monohydric phenol-aldehyde condensation products of this type.

Condensation products of polyhydroxynaphthalenes with aldehydes are extremely useful commercially because of their high reactivity which enables the bonding of wood, for example, at ordinary room temperatures with great rapidity and with the development of very strong bonds capable of withstanding indefinite soaking in water on indefinite long-term exposure to the weather. Such adhesives are very useful in laminating timber.

The thermosetting resins produced by the invention which are the reaction products of a monohydric phenol, a polyhydroxynaphthalene, and an aldehyde, are particularly good adhesives for bonding wood veneers into plywood through the application of heat and pressure in a hot-press. Plywood bonded with the resin adhesives of this invention is characterized by a high degree of resistance to boiling water, as tested by the accelerated test method specified in Commercial Standard 45–60 of the U.S. Department of Commerce and are further characterized by a high degree of resistance to delamination even after long exposure to weather in exterior use.

The condensation of alpha-naphthol and an aldehyde as well as the reaction of beta-naphthol with an aldehyde is old and well-known in the art. Reference thereto may be found in the text by Ellis, "The Chemistry of Synthetic Resins" published by Reinhold Publishing Co., for example. The reaction of alpha-naphthol and beta-naphthol with an aldehyde is not to be confused in any way with the subject matter of this invention which relates to the condensation of polyhdroxynaphthalenes with aldehydes. The difference in reactivity between the naphthols and formaldehyde and the reaction between the polyhydroxynaphthalenes and formaldehyde is remarkable. It is not possible, for example, to make cold-setting resin adhesive from the naphthols while it is quite practicable to do so with the polyhydroxynaphthalenes.

In carrying out my invention I use alkali as a catalyst in effecting the condensation reaction of a polyhydroxynaphthalene with an aldehyde and/or a monohydric phenol-aldehyde condensation product. The preferred alkali is sodium hydroxide because of its ready availability and lesser cost. Other alkali metal hydroxides such as potassium hydroxide or lithium hydroxide may be used although there is no particular advantage in their use. The effectiveness of the alkali metal hydroxides has to do with their ability to form water soluble salts with the polyhydroxynaphthalenes. The alkali metal salts of polyhydroxynaphthalenes may also be made by reacting the polyhydroxynaphthalenes with any of the alkali metal carbonates such as sodium carbonates under such elevated temperatures that carbon dioxide is effectively volatilized and removed from the solution. Certain of the tertiary-nitrogen-organic bases such as triethanolamine have a limited usefulness depending on the degree to which they form water soluble salts with the polyhydroxynaphthalenes.

Particularly effective are the products obtained by reacting an aqueous alkaline monohydric phenol-aldehyde condensation product such as defined in U.S. Patents Nos. Re. 23,347; 2,360,376; 2,437,981; and 2,462,253, together with a polyhydroxynaphthalene in the presence of additional aldehyde, dialdehyde, or aldehyde releasing compound. Such products are useful in the bonding of cellulose fiber, wood, paper, etc. By aldehyde releasing compound I mean paraformaldehyde, hexamethylene tetramine dimethylol formamide, dimethylol-urea, tris-hydroxymethyl-nitromethane, and the like. Aqueous resin solutions as described in the foregoing patents, and containing a polyhydroxynaphthalene and additional aldehyde, are particularly well adapted to use in the manufacture of plywood in a hot-press where they provide extremely rapid cure. Resins of this invention, so constituted, are faster reacting and will provide a three-dimensional gel structure sooner when subjected to a definite heating cycle than will an alkaline monohydric phenol-aldehyde resin of the same solids content and viscosity. Furthermore, such resins of this invention are capable of bonding dissimilar surfaces to a degree not possible with alkaline aqueous phenol-formaldehyde resins.

For instance, in the manufacture of Douglas Fir plywood, the bonding of veneers whose surfaces are more hydrophobic in character as a result of having been dried at accelerated drying rates in a direct fired veneer drier is particularly difficult with the alkaline aqueous phenol-formaldehyde resins such as are described in U.S. Patent Nos. Re. 23,347 and 2,437,981. Such veneers are not only case-hardened due to the rapid drying rate but also have an oily film deposited on their surface which at least in part is due to the deposition of the incomplete products of combustion of the fuel used in firing the direct fired veneer dryer. The surface of these veneers is more hydrophobic than veneers dried under a slower drying schedule in, for example, a steam heated veneer drier. It is of considerable economic importance to be able to bond veneers dried in a direct fired veneer drier, due to the lower cost of drying such veneers. The resin adhesives of this invention which are the combination of a polyhydroxynaphthalene, an alkaline aqueous monohydric phenol-aldehyde condensation product, and additional aldehyde are superior adhesives for bonding such veneers. Such resin adhesives of this invention are generally dark red through brown to black in color. This is of particular advantage in the application of such resin adhesives to veneers in the manufacture of plywood since the adhesive spread is easily seen and any irregularities may be readily corrected.

Resin adhesives of this invention have better wetting properties than the phenol-formaldehyde resins commonly used in the manufacture of plywood. This is important because unless the surface to be bonded can be adequately wetted by the resin adhesive, no bond or at least only a superficial bond will result.

Resin adhesives of this invention and consisting of the combination of a polyhydroxynaphthalene, an alkaline aqueous monohydric phenol-aldehyde condensation product and additional aldehyde including fillers and extenders, are extremely fast setting and useful in increasing the production rate through a plywood hot-press. This is an important feature of my invention since the output of a plywood plant is governed largely by the rate of production at the plywood hot-press and that rate of production is inversely proportional to the pressing time required.

For example, a plywood hot-press producing 100,000 sq. ft. of ⅝″ plywood per 8 hour shift, when using a conventional alkaline aqueous phenol-formaldehyde resin requiring a pressing time of 8 minutes at a platen temperature of 280° F. can produce approximately 200,000 sq. ft of the same plywood in the same 8 hour shift when a resin-adhesive of my invention requiring only a 4 minute pressing time at 280° F. is used. The resin adhesives of this invention, which consist of the combination of a polyhydroxynaphthalene, an alkaline aqueous monohydric phenol-aldehyde condensation product, and additional aldehyde, are capable of such bonding speeds and represent a most significant advance in the plywood hot pressing art since without any change in capital investment in equipment or in required labor, it is possible through the use of the polyhydroxynaphthalene containing resin adhesive to double the production of plywood meeting the Exterior Grade requirements of U.S. Commercial Standard 45–60. The economic advantage of the use of a polyhydroxynaphthalene containing resin adhesive is immediately apparent.

Furthermore, important modifications in the plywood manufacturing process may be made which enable the use of wood veneers at a higher moisture content, thereby producing a plywood panel which is closer to the equilibrium moisture content and hence less likely to warp or surface-check and which is more receptive to paint. A coat of paint on such plywood will withstand weathering to a greater degree than will a more dry, conventionally manufactured plywood panel.

Important savings in plywood processing costs may be made using a polyhydroxynaphthalene containing resin adhesive capable of bonding wood veneers of higher moisture content in the range of 5% to 10% moisture content, since it is not necessary to dry veneers down to the 0% to 3% moisture content range customarily required when using conventional alkaline aqueous phenol-formaldehyde resin adhesives. As a result the production rate through the veneer dryer may be considerably increased thus resulting in substantial savings in overall production cost.

The resin adhesives of this invention can be used "as is," (i.e. without the addition of fillers or extenders), in the manufacture of plywood by giving ample assembly time to adhesive spread veneers. Wood veneers coated with resin adhesive can be allowed to air dry anywhere from 30 minutes to several days before hot pressing. For increased economy the use of various fillers and extenders is advantageous. Typical of such fillers and extenders are: fine ground wood flour, nutshell flour, wheat flour, rye flour, starch, gypsum, clay, and the like. Alkali swollen or alkali pulped wood flour, nutshell flour, or the fine ground residue from the manufacture of furfural from corncobs or oat hulls may also be used in whole or in part.

Various water soluble or water dispersible thickening agents such as methyl-cellulose, hydroxy-ethyl-cellulose, sodium carboxy-methyl-cellulose, methyl starch, hydroxy-ethyl-starch, polyvinyl alcohol, and the like, can also be utilized.

The reactivity of polyhydroxynaphthalenes towards aldehydes is so high that they may be regarded as aldehyde scavengers. In making multicomponent resins such as a polyhydroxynaphthalene- monohydric phenol-aldehyde alkaline condensation product, for example, it is absolutely necessary to react the slower reacting components first (namely the monohydric phenol and the aldehyde), until suitably reacted and until the free aldehyde content has been reduced to a value below that which gives a gel with the amount of polyhydroxynaphthalene to be added. The reaction of the polyhydroxynaphthalene with the free aldehyde and compounds or resins containing free methylol groups can then be better controlled.

It is not necessary to subject the polyhydroxynaphthalenes and their coreactants to elevated temperatures (such as the boiling point of their solution circa 212° F. to 220° F.) to effect reaction although such may be used. Temperatures below 212° F. are satisfactory and often are desirable to ameliorate the reaction. In fact, under proper circumstances, reaction at ambient room temperature (circa 70° F.) is all that is necessary to effect reaction.

In order to further show the nature and principles of reaction according to the invention, the following examples are given.

Example I 160 grams (1.0 gram-mole) of 1,5-naphthalenediol were dissolved in 160 cc. of water and 40 cc. of 50% sodium hydroxide solution (0.75 gram-mole) was added. To this was added a viscous solution consisting of 160 cc. of water containing 3.2 grams of sodium carboxymethyl-cellulose. 30 grams of fine ground Red Fir wood flour and 51 grams of fine ground paraformaldehyde (substantially all through 325 mesh) were stirred in. The mixture was maintained at 70° F. and had a pot life of about 4 hours, at which time it had hardened to a stiff jelly. When the adhesive mix was 1 hour old, pieces of 1/10" Douglas Fir veneer core were spread at the rate of 120#/1000 sq. ft. of double glue line and laid up into 3-ply plywood using 1/10" Douglas Fir face veneers. After an assembly time of 10 minutes, the plywood assemblies were pressed at 150 p.s.i. hydraulic pressure and clamped for 12 hours at room temperature. The resulting plywood showed excellent adhesion. An attempt to separate the plies with a chisel showed no glue failure, i.e. 100% wood failure. Plywood tested in conventional fashion showed 320 p.s.i. shear value with 100% wood failure when tested in the dry state, showed 321 p.s.i. shear value with 100% wood failure when tested wet after soaking for 48 hours at 70° F., and showed 280 p.s.i. shear value with 100% wood failure when tested wet after boiling the shear specimens for 4 hours, drying for 16 hours at 120° F. and then boiling them for an additional 4 hours.

This Example I shows the extreme reactivity of 1,5-naphthalenediol since the resinification and the plywood bonding all occurred at ambient room temperature. 75% of the 1,5 naphthalenediol present was in the sodium salt form.

Example II 160 grams (1.0 gram-mole) of 1,5-naphthalenediol were dissolved in 160 cc. of water and 20 cc. of 50% sodium hydroxide solution (0.375 gram-mole) was added. On warming to about 50° C., 37.5 cc. of formalin (37% formaldehyde solution containing 7% methanol inhibitor) diluted with 37.5 cc. of methanol was added slowly with vigorous stirring, the temperature being maintained at 50° C. for about 20 minutes, after which an additional 20 cc. of formalin was cautiously added while continuing to maintain the temperature at 50° C. At the conclusion of the aldehyde addition the reacting mass was heated to 70° C. and held for 20 additional minutes and then cooled to room temperature (20° C.). (At this point 0.765 gram-moles of formaldehyde were combined with 1 gram-mole of 1.5 naphthalenediol and 0.375 gram-mole of sodium hydroxide to give a permanently thermoplastic resin.)

To this were added 40 grams of finely ground walnut shell flour (substantially all through 325 mesh) and an additional 20 cc. of formalin. (This brought the total aldehyde up to 1.03 gram-moles.) A sample of this mixed adhesive jelled in 5 minutes when heated to 75° C. 3-ply Douglas Fir plywood was made using 1/10" core and faces. The adhesive was spread at the rate of 80#/1000 sq. ft. of double glue line and the assembly time was 20 minutes. The assembly was hot pressed for 3 minutes in a steam heated hot-press having a platen temperature of 240° F. and at a hydraulic pressure of 175 p.s.i.

The resulting plywood had an excellent bond and when tested in shear showed 278 p.s.i. with 95% wood failure. These plywood specimens were subjected to boiling water for 4 hours, drying for 16 hours at 120° F. and boiling for an additional 4 hours, and when tested wet showed 258 p.s.i. sheer strength with 92% wood failure. This plywood showed excellent weather resistance.

This Example II shows that even with a highly reactive polyhydroxynaphthalene such as 1,5 naphthalenediol, it is possible to react 0.765 gram-moles of formaldehyde with 1 gram-mole of 1,5-naphthalenediol and 0.375 gram-moles of sodium hydroxide to give a permanently fusible water soluble resin. Other diols, namely 1,3-naphthalenediol and 2,7-naphthalenediol were found to react similarly to give permanently fusible resins at the same ratio of aldehyde to naphthalenediol.

The addition of aldehyde bringing the total mole ratio based on the diol up to 1.03 was sufficient to bring about thermosetting as shown by the gelation test data.

Example III

An aqueous alkaline monohydric phenol-aldehyde resin solution was prepared from phenol, formaldehyde, and sodium hydroxide according to the procedure of U.S. Patent No. 2,360,376. The phenol employed was C.P. grade. The formalin employed was a methanol-free grade containing 37.5% formaldehyde with less than 1% methanol and 0.01% formic acid. The charge to the resin kettle was 940 grams (or 10 gram-moles) of phenol, 1790 grams (or 22.5 gram-moles) of formalin, 299 grams (or 3.6 gram-moles) of 48.5% sodium hydroxide, and 760 grams of water. After all the materials were charged and mixed, the mass was heated to 218° F. in 7 minutes and held at reflux for 52 minutes, and then cooled to 70° F. in 19 minutes. At the conclusion of the cook the odor of formaldehyde was completely absent. At 70° F. the viscosity was 800 cps. and had a gel time at 212° F. of 24 minutes. This resin solution will be referred to hereinafter as Resin Solution A.

A plywood adhesive was prepared by mixing 12 grams of 325 mesh Red Fir wood flour with 200 grams of the previously prepared Resin Solution A. This adhesive (which will hereinafter be referred to as Adhesive B) was used to make 13/16" Douglas Fir plywood having a construction of 1/8" faces and 3/16" core and centers. The adhesive was spread at the rate of 60#/1000 sq. ft. of double glue line. The assembly time was 20 minutes. The assembly was hot pressed for 9½ minutes in a hot-press having a platen temperature of 285° F. The resulting plywood had a good bond and when tested in the boil test described in Example II showed a shear value of 178 p.s.i. with 90% wood failure. It was noted that a pressing time of 9½ minutes was required to produce good plywood. Results were erratic when less than 9½ minutes of pressing time were tried. This demonstrates the required pressing time for a monohydric phenol-aldehyde resin adhesive and is to be contrasted with the following. 5 grams of 1,5-naphthalene-diol and 6 grams of 325 mesh Red Fir wood flour were mixed with 100 grams of the previously prepared Resin Solution A. This adhesive was tested exactly as the previous Adhesive B only it was found that a pressing time of only 6½ minutes at 285° F. was required. This is a saving of 3 minutes per pressed panel and demonstrates the greater production rate possible with an adhesive characteristic of my invention, especially an adhesive involving the reaction of 1,5-naphthalenediol with an alkaline aqueous phenol-formaldehyde resin solution in the absence of any separate aldehyde addition. Plywood made with this adhesive was of exterior type quality and when tested in the boil test as described in Example II showed a shear value of 181 p.s.i. with 92% wood failure.

Example IV

An adhesive was prepared by mixing at room temperature (circa 70° F.) 10 grams of 2,7-naphthalenediol, 20 grams of water, 6 grams of formalin (containing 37.5% formaldehyde and 6.5% methanol), 6 grams of 325 mesh Red Fir wood flour and 100 grams of the Resin Solution A of Example III.

13/16" Douglas Fir plywood was prepared following the procedure of Example III. It was found that pressing time of 8 minutes was required. The plywood produced had an excellent bond and was of Exterior Type quality. Samples tested in the boil test described in Example II showed a shear value of 157 p.s.i. with 91% wood failure.

This demonstrates the efficiency in using a polyhydroxynaphthalene together with separate aldehyde addition to an aqueous alkaline monohydric phenol-aldehyde resin solution to produce a resin adhesive.

*Example V*

An adhesive was prepared by mixing at room temperature (circa 70° F.) 5 grams of 1,5-naphthalenediol, 10 grams of water, 3 grams of formalin (containing 37.5% formaldehyde and 6.5% methanol), 6 grams of 325 mesh Red Fir wood flour and 100 grams of Resin Solution A of Example III. This gave a dark brown colored adhesive mix having a good viscosity for roll spreading onto veneers. The viscosity was 2100 cps. at 70° F.

13/16″ Douglas Fir plywood was prepared following the procedure of Example III. It was found that with this adhesive a pressing time of only 4½ minutes was required at 285° F. The plywood produced had an excellent bond of Exterior Type quality. Samples tested in the boil test described in Example II showed a shear value of 146 p.s.i. with 93% wood failure.

This demonstrates the extremely fast pressing time made possible by the combination of 1,5 naphthalenediol with an alkaline phenol-formaldehyde resin solution and with additional formaldehyde. Similar results were obtained when 5 grams of a 25% glyoxal solution were substituted for the 3 grams of formalin.

*Example VI*

An aqueous alkaline phenol-formaldehyde resin solution was prepared exactly as in Example III using 940 grams of phenol, 1790 grams of formalin, 299 grams of 48.5% sodium hydroxide, and 760 grams of water. After the formaldehyde disappearance had occurred and the cooking had progressed to the point that a sample removed and cooled to 70° F. had a viscosity of 820 cps., the contents of the resin kettle were rapidly chilled to 140° F. and 320 grams of 1,3-naphthalenediol in 640 grams of water was added. After the 1,3-naphthalenediol was completely dissolved in the resin mix, the temperature of the contents of the resin kettle was elevated to 170° F. and held there for 15 minutes to further the condensation reaction between the 1,3-naphthalenodiol and the phenol-formaldehyde condensation product. The contents of the kettle were then chilled rapidly to 70° F. The viscosity was about 850 cps. and the resin was medium brown in color.

An adhesive was prepared by taking and mixing 130 grams of the resin solution as above prepared, 6 grams of 325 mesh Red Fir wood flour, and 6 grams of formalin (37.5% formaldehyde and 6.5% methanol). This gave a smooth easily spreadable adhesive which readily wetted more hydrophobic veneers.

13/16″ Douglas Fir plywood was prepared following the procedure of Example III. It was found that with this adhesive a pressing time of 9 minutes at 285° F. was required. Excellent quality of the bond was noted. Samples tested in the boil test described in Example II showed a shear value of 137 p.s.i. with 93% wood failure.

This demonstrates that the combination of a polyhydroxynaphthalene reacted at elevated temperature with a monohydric phenol-aldehyde condensation product gives a stable resin solution which is a good commercial adhesive when combined with additional aldehyde at the time of use.

*Example VII*

In the following tests, 10 grams of the Resin Solution A of Example III were mixed at 70° F. with various amounts of 1,5-naphthalenediol or resorcinol plus additional water and formalin (37.5% formaldehyde and 6.5% methanol). 5 grams of the mixture was then placed in a 10 cm. test tube and the tube immediately immersed in boiling water. The length of time for gelation was noted. This was done by using a thin iron wire bent on one end to stir the mixture and determine the point of gelation, which was taken as the moment when solid gelled resin is visible on the up-stroke of stirring. A complete stirring cycle occupied about 10 seconds. By using a small constant size sample the time to reach thermal equilibrium is held substantially constant.

A measure of the reactivity of an aqueous thermosetting resin is the length of time it takes for a small sample of the resin to undergo gelation when elevated to and held at 212° F. This reactivity constant (which is abbreviated as "gel time at 212° F."), is closely related to the required pressing time for a given plywood construction at a given press temperature.

TABLE 1

| Experiment No. | Composition of Mixture | | | | | Gel time at 212° F. in minutes |
|---|---|---|---|---|---|---|
| | Resin Solution A in grams | Resorcinol in grams | 1,5-naphthalenediol in grams | Water at 70° F. in grams | Formalin in grams | |
| A | 10 | | | | | 24 |
| B | 10 | 2 | | | | 36 |
| C | 10 | | 2 | | | 16 |
| D | 10 | | 0.5 | | | 8½ |
| E | 10 | 1 | | 2 | 0.6 | 6 |
| F | 10 | | 1 | 2 | 0.6 | 1 |
| G | 10 | | 0.5 | 1 | 0.3 | 1½ |
| H | 10 | | 0.25 | 1.5 | 0.15 | 10–15 |

These results show the difference in behavior between resorcinol and 1,5-naphthalenediol in combination with a typical alkaline aqueous phenol-formaldehyde condensation product (Resin Solution A).

It is to be noted that the additions of resorcinol to Resin Solution A in the absence of additional formalin lengthens the gel time at 212° F. over the standard (Exper. A) whereas a comparable addition of 1,5-naphthalenediol shortens the gel time very considerably. This indicates the greater reactivity of 1,5-naphthalenediol with the available methylol groups in the phenol-formaldehyde resin of Resin Solution A.

Experiments E and F compare resorcinol and 1,5-naphthalenediol in the presence of added formalin. Under the conditions of this experiment, 1,5-naphthalenediol proves to be six times as fast reacting as resorcinol.

Experiments F, G and H show the effect of change in 1,5-naphthalenediol concentration in reaction with Resin Solution A and in the presence of added formalin. The maximum reactivity effect occurs at 10% addition (Exper. F). However, the reactivity with a 5% addition is almost as high (Exper. G). Even at the 2.5% addition level the effect of the 1,5-naphthalenediol in reducing the gel time is marked.

Of the dihydroxybenzene isomers, resorcinol is the most reactive. This is readily explainable since resorcinol is meta-dihydroxybenzene. The two hydroxyl groups influence further ring substitution in the 2, 4, 6 positions, which is where the reaction with an incoming methylol group or aldehyde occurs. The influence of the two hydroxyl groups is twice the influence of only one hydroxyl group. This effect is additive for the two hydroxyl groups in resorcinol.

In orcinol, the ortho-dihydroxybenzene, and in quinol, the para-dihydroxybenzene, the effect of one hydroxyl nullifies to a considerable extent the influence of the other so that the total orienting influence is less than that in the meta-dihydroxybenzene. Furthermore, instead of three positions (i.e. 2, 4, 6 as resorcinol has) being open for reaction with a methylol group or aldehyde, in orcinol and quinol only two positions are open since the third is already occupied by one of the hydroxyl groups.

In the series of isomers of dihydroxynaphthalene, the most reactive is 1,5-dihydroxynaphthalene. In this compound the orienting effect of the two hydroxyls is additive. Each hydroxyl group is in a different ring and the 2, 4, 6, 8 positions are each open for reaction with a methylol group or an aldehyde. 1,7-dihydroxynaphthalene behaves similarly to 1,5-dihydroxynaphthalene. 1,3-dihydroxynaphthalene has its two hydroxyl groups in one ring and while the orienting influence is substantially additive only two positions (namely, the 2, 4 positions) are open for easy substitution. 1,3-dihydroxynaphthalene with only half of the easily substituted positions, as compared with 1,5-dihydroxynaphthalene, is less reactive than the latter. In 2,7-dihydroxynaphthalene the two hydroxyls are in separate rings but are farther apart in their influence one on the other so that the 1, 3, 6, 8 positions are not quite so easily substituted as the 2, 4, 6, 8 positions available in the 1,5-dihydroxynaphthalene.

1,3,5 trihydroxynaphthalene and 1,5,7 trihydroxynaphthalene behave similarly to 1,5-dihydroxynaphthalene in permitting rapid reaction with entering methylol groups or aldehyde groups going into the 2, 4, 6, 8 open positions. In the commercially available materials, various isomers are present in varying percentages. Where isomers of trihydroxynaphthalene have a hydroxyl in a position which cuts down in the total available substitutable positions from four to the per molecular it is to be expected that the reactivity will be lessened proportionately.

In reacting a polyhydroxynaphthalene with the aqueous alkaline condensation product of a monohydric phenol and an aldehyde it is important that the reaction at elevated temperature between the monohydric phenol and the aldehyde be substantially far enough along so that the free aldehyde which is available to react with the more highly reactive polyhydroxynaphthalene be at a sufficiently low level so as to not cause any gelation as a result of reaction of free aldehyde with the polyhydroxynaphthalene. In general, the level of free aldehyde available at the time the polyhydroxynaphthalene is added should be less than about 0.5 mole per mole of polyhydroxynaphthalene added. At lower temperatures a higher molar ratio (e.g. 1.0 or more) can be tolerated. Preferably the odor of aldehyde, which is an excellent indication of the presence of the aldehyde, should have disappeared before the addition of the polyhydroxynaphthalene. Under these circumstances the polyhydroxynaphthalene reacts with the free methylol groups of the monohydric phenol-aldehyde condensation product in predictable fashion. The control of such reaction by control of the time-temperature cycle is thus readily obtained.

After a polyhydroxynaphthalene has been reacted with an aqueous alkaline monohydric phenol-aldehyde condensation product, the addition of further aldehyde in a cooking stage may be made. At this stage the resin is extremely sensitive to heat and the amount of aldehyde added. A monohydric phenol-aldehyde resin such as the Resin Solution A of Example III should have not more than 10% by weight of additional aldehyde (based on the total weight of resin) reacted after the reaction of the polyhydroxynaphthalene with the Resin Solution A and the temperature of the reaction should preferably be held between room temperature and approximately 180° F.

The resins of the invention may be applied in any of a number of ways. For instance, spray dried monohydric phenol-aldehyde resin, 1,5-naphthalenediol and an aldehyde such as paraformaldehyde may be mixed with dry wood flakes and hot pressed to give a flakeboard.

In another process a resin solution of a monohydric phenol-aldehyde condensation product and a polyhydroxynaphthalene is added to a slurry of wood fiber in water and the resin and polyhydroxynaphthalene is precipitated together by the addition of alum coagulants together with appropriate pH control. The wood fiber coated with the precipitated resin is filtered and the resulting mat is dried and hot pressed to give a hardboard. In all cases these processes are distinguished by faster pressing cycles than is possible with the monohydric phenol-aldehyde resin alone.

From the foregoing, other variations and adaptations of the reactions and reaction products characteristic of the invention will occur to those skilled in the art to which the invention is addressed, within the scope of the following claims.

What is claimed is:

1. An aqueous alkaline adhesive solution containing alkaline-catalyzed monohydric phenol-aldehyde condensate, and the reaction product of an aldehyde and a polyhydroxynaphthalene.

2. A composition of matter comprising an alkaline-catalyzed monohydric phenol-aldehyde resin, and an alkaline-catalyzed polyhydroxynaphthalene-aldehyde resin.

3. The adhesive product formed on curing of the adhesive solution specified in claim 1.

4. A laminated product including an intersurface bond formed by the adhesive of claim 3.

5. Plywood with veneers interbonded with the adhesive of claim 3.

6. The plywood of claim 5, comprising veneers rendered relatively hydrophobic by having been dried in a fuel fired kiln.

7. A composition of matter produced by reacting a monohydric phenol and an aldehyde in an alkaline medium to form a phenol-aldehyde reaction product containing free aldehyde, and further reacting the phenol-aldehyde reaction product and free aldehyde with a polyhydroxynaphthalene.

8. A composition of matter comprising the reaction product produced by the condensation reaction of a polyhydroxynaphthalene with an aqueous, alkaline, free aldehyde-containing, monohydric phenol-aldehyde condensate reaction product solution.

9. A condensation product according to claim 8, wherein said polyhydroxynaphthalene is present in an amount less than about 10% by weight of the weight of the phenol-aldehyde condensate resin solution.

10. A condensation product according to claim 8, wherein said free aldehyde is present in molar amount at least some of the free aldehyde therein but not sufnaphthalene.

11. The method of forming a thermosetting resin adhesive comprising forming a free aldehyde containing, alkaline aqueous solution of a monohydric phenol-aldehyde condensation product, adding to said solution an amount of polyhydroxynaphthalene sufficient to react with at least some of the free aldehyde therein but not sufficient to cause gelation of the solution, and subsequently adding to the resulting solution, immediately prior to use thereof as an adhesive, an amount of free aldehyde sufficient to cause rapid gelation of said solution.

12. The method of bonding wood and wood product surfaces, comprising:

(a) applying to at least one of said surfaces an adhesive comprising an alkaline aqueous solution incorporating a polyhydroxynaphthalene and an aldehyde or an aldehyde liberating compound selected from the group consisting of monohydric phenol-aldehyde reaction products, and mixtures thereof with free aldehydes;

(b) pressing the surfaces together; and (c) allowing the adhesive to set.

13. An article formed by the method of claim 12.
14. Plywood formed by the method of claim 12.

References Cited

UNITED STATES PATENTS

| | | | |
|---|---|---|---|
| 2,036,916 | 4/1936 | Bruson | 260—51 |
| 2,198,318 | 4/1940 | Sachanen et al. | 260—51 |
| 2,378,794 | 6/1945 | Rummelsburg | 260—848 |
| 2,504,100 | 4/1950 | Plank et al. | 260—51 |
| 3,111,448 | 11/1963 | Tawney | 260—54 |

FOREIGN PATENTS 762,462  11/1956  Great Britain.

MURRAY TILLMAN, *Primary Examiner.*

J. C. BLEUTGE, *Assistant Examiner.*